United States Patent
Ogura et al.

(10) Patent No.: US 9,366,833 B2
(45) Date of Patent: Jun. 14, 2016

(54) OPTICAL COMMUNICATION MODULE AND OPTICAL COMMUNICATION DEVICE

(71) Applicant: Hitachi Metals, Ltd., Tokyo (JP)

(72) Inventors: Akira Ogura, Hitachi (JP); Masataka Sato, Hitachi (JP); Shinji Komatsuzaki, Mito (JP); Kinya Yamazaki, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/542,968

(22) Filed: Nov. 17, 2014

(65) Prior Publication Data

US 2015/0160422 A1    Jun. 11, 2015

(30) Foreign Application Priority Data

Dec. 9, 2013   (JP) .................................. 2013-254021

(51) Int. Cl.
G02B 6/32   (2006.01)
G02B 6/42   (2006.01)

(52) U.S. Cl.
CPC ............ G02B 6/4249 (2013.01); G02B 6/4206 (2013.01); G02B 6/4214 (2013.01)

(58) Field of Classification Search
CPC ........ G02B 6/43; G02B 6/428; G02B 6/3807; G02B 6/4201
USPC .................................... 385/33, 40, 52, 88–92
See application file for complete search history.

(56) References Cited

U.S. PATENT DOCUMENTS

| | | | | |
|---|---|---|---|---|
| 5,031,984 A | * | 7/1991 | Eide et al. ....................... | 385/27 |
| 5,214,444 A | * | 5/1993 | Kerr et al. ...................... | 347/238 |
| 5,515,468 A | * | 5/1996 | DeAndrea et al. .............. | 385/88 |
| 5,596,665 A | * | 1/1997 | Kurashima et al. ............. | 385/92 |
| 5,796,899 A | * | 8/1998 | Butrie et al. .................... | 385/92 |
| 6,179,483 B1 | * | 1/2001 | Kanazawa ...................... | 385/93 |
| 6,220,878 B1 | * | 4/2001 | Poplawski et al. .............. | 439/92 |
| D468,707 S | * | 1/2003 | Wu et al. ....................... | D13/173 |
| 7,116,912 B2 | * | 10/2006 | Pang et al. ..................... | 398/139 |
| 7,702,198 B2 | * | 4/2010 | Shibayama ..................... | 385/33 |
| 8,950,954 B2 | * | 2/2015 | Wang et al. ..................... | 385/94 |
| 8,985,865 B2 | * | 3/2015 | Howard et al. .................. | 385/79 |

FOREIGN PATENT DOCUMENTS

JP           2004-029710 A       1/2004

* cited by examiner

*Primary Examiner* — Ellen Kim
(74) *Attorney, Agent, or Firm* — Scully, Scott, Murphy & Presser, PC

(57) ABSTRACT

An optical communication module is composed of a photoelectric conversion element to transduce an optical signal into an electrical signal or an electrical signal into an optical signal, an optical fiber including an end and being optically coupled to the photoelectric conversion element, a receiving member including an outer surface and receiving the end of the optical fiber and the photoelectric conversion element, and a plurality of electrodes protruded from the outer surface of the receiving member and aligned in a straight line. The optical fiber is drawn from the outer surface of the receiving member and in an oblique direction relative to a direction of the alignment of the plurality of electrodes.

5 Claims, 8 Drawing Sheets

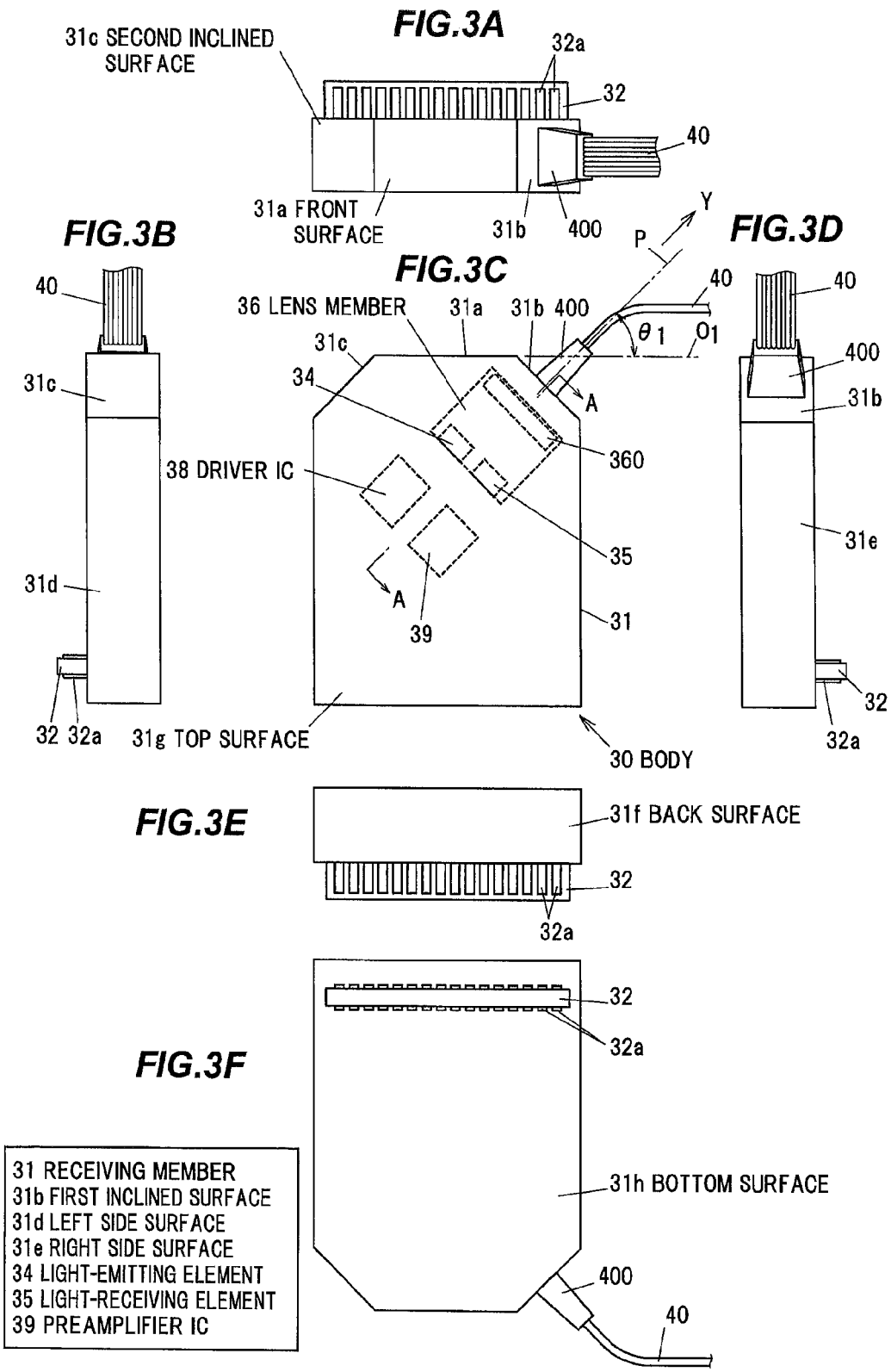

OPTICAL COMMUNICATION MODULE AND OPTICAL COMMUNICATION DEVICE

The present application is based on Japanese patent application No. 2013-254021 filed on Dec. 9, 2013, the entire contents of which are incorporated herein by reference.

BACKGROUND OF THE INVENTION

1. Field of the Invention

This invention relates to an optical communication module and an optical communication device.

2. Description of the Related Art

An optical communication module to perform an optical communication using an optical fiber as a transmission medium has been known (Refer to e.g. JP-A-2004-29710).

The optical communication module disclosed in JP-A-2004-29710 includes an optical element, which is optically coupled to an optical fiber, a silicon substrate, which is mounted with the optical element, an optical connector ferrule, which holds the optical fiber, and a rectangular parallelepiped shaped sealing member, which seals (receives) the optical element, the silicon substrate and the optical connector ferrule. The optical fiber is drawn from an end face of the optical connector ferrule in a longitudinal direction of the sealing member.

Refer to JP-A-2004-29710, for example.

SUMMARY OF THE INVENTION

Now, for the optical fiber, in general, its allowable bending radius is specified, and if the optical fiber is bent at a radius of curvature smaller than the allowable bending radius, the optical fiber is likely to break or its optical properties are likely to degrade. For that reason, the optical fiber drawn out from the sealing member is protruded in the direction of the drawing from the sealing member and is routed so that the optical fiber is not bent at the radius of curvature smaller than that allowable bending radius.

FIG. 9 is a plan view showing six conventional optical communication modules 8 arranged opposite each other in two columns respectively on a circuit board 7. The optical communication modules 8 shown in FIG. 9 include each body 80 sealed with the sealing member and each optical fiber 81 drawn from the respective body 80, and the respective bodies 80 of the plurality of optical communication modules 8 are arranged parallel to each other in the two columns respectively.

In each of the two columns, the respective bodies 80 of the three optical communication modules 8 are aligned in a straight line, and the optical fiber 81 of each of the optical communication modules 8 is routed on the circuit board 7, between the respective bodies 80 of the optical communication modules 8 in both the columns, in such a manner as to be parallel to the direction of the alignment of the three optical communication modules 8 in each of the two columns.

Because as mentioned previously, the optical fibers 81 cannot be bent at the radius of curvature smaller than the predetermined allowable bending radius, the distance dimension $D_2$ between the respective bodies 80 of pairs of the optical communication modules 8 opposite each other with the optical fibers 81 therebetween cannot be made smaller than twice the allowable bending radius dimension of the optical fiber 81.

Also, because no electronic component which obstructs the routing of the optical fibers 81 can be mounted on the area for the optical fibers 81 to be routed on the circuit board 7, it is necessary to ensure not only the area for the respective bodies 80 of the optical communication modules 8 to be arranged, but also the area for the optical fibers 81 to be routed, as the area for the plurality of optical communication modules 8 to be arranged. As a result, the area the optical communication modules occupy on the circuit board 7 increases. This is a factor in preventing the high density component mounting on the circuit board 7.

Accordingly, it is an object of the present invention to provide an optical communication module, which allows for arranging a plurality of the optical communication modules on a circuit board at a high density and reducing the area the optical communication modules occupy on the circuit board.

Also, it is another object of the present invention to provide an optical communication device, which allows for arranging a plurality of the optical communication modules on the circuit board at a high density and thereby being reduced in size.

(1) According to one embodiment of the invention, an optical communication module comprises:

a photoelectric conversion element to transduce an optical signal into an electrical signal or an electrical signal into an optical signal;

an optical fiber including an end and being optically coupled to the photoelectric conversion element;

a receiving member including an outer surface and receiving the end of the optical fiber and the photoelectric conversion element; and a plurality of electrodes protruded from the outer surface of the receiving member and aligned in a straight line, the optical fiber being drawn from the outer surface of the receiving member and in an oblique direction relative to a direction of the alignment of the plurality of electrodes.

In one embodiment, the following modifications and changes may be made.

(i) The direction of the alignment of the plurality of electrodes and the direction of the drawing of the optical fiber make an angle within a range of 45±15 degrees.

(ii) The receiving member includes a first side surface, from which the optical fiber is drawn, a second side surface, which meets the first side surface at an obtuse angle, and a third side surface, which meets the second side surface at an obtuse angle on an opposite side of the second side surface to the first side surface.

(iii) The receiving member includes a plurality of the photoelectric conversion elements arranged side by side at right angles to the direction of the drawing of the optical fiber, and a single lens member, which optically couples the plurality of the photoelectric conversion elements and the optical fiber together.

(iv) The receiving member includes a plurality of the photoelectric conversion elements arranged side by side in the direction of the alignment of the plurality of electrodes, a lens member, and a waveguide member interposed between the lens member and the optical fiber, the lens member and the waveguide member optically coupling the plurality of the photoelectric conversion elements and the optical fiber together.

(2) According to another embodiment of the invention, an optical communication device comprises:

a circuit board formed with a wiring pattern thereon; and a plurality of optical communication modules arranged on the circuit board, the optical communication modules comprising:

each body including each photoelectric conversion element to transduce an optical signal into an electrical signal or an electrical signal into an optical signal, and each receiving member including an outer surface and receiving the respective photoelectric conversion element, the respective bodies of the optical communication modules being aligned in a predetermined alignment direction on the circuit board; and each optical fiber optically coupled to the respective photoelectric conversion element and drawn from the outer surface of the respective receiving member and in an oblique direction relative to the predetermined alignment direction.

In another embodiment, the following modifications and changes may be made.

The respective receiving members of the optical communication modules include each first side surface, from which the respective optical fiber is drawn, each second side surface, which meets the respective first side surface at an obtuse angle and which is parallel to the predetermined alignment direction, and each third side surface, which meets the respective second side surface at an obtuse angle on an opposite side of the respective second side surface to the respective first side surface.

Points of the Invention

The present invention allows for reducing the area the optical communication modules occupy on the circuit board and arranging the plurality of the optical communication modules on the circuit board at a high density. Further, it is possible to reduce the size of the optical communication device.

BRIEF DESCRIPTION OF THE DRAWINGS

The preferred embodiments according to the invention will be explained below referring to the drawings, wherein:

FIG. 3A is a front view showing the optical communication module;

FIG. 3B is a left side view showing the optical communication module;

FIG. 3C is a plan view showing the optical communication module;

FIG. 3D is a right side view showing the optical communication module;

FIG. 3E is a back view showing the optical communication module;

FIG. 3F is a bottom plan view showing the optical communication module;

DETAILED DESCRIPTION OF THE EMBODIMENT

Embodiment

Figure 1:
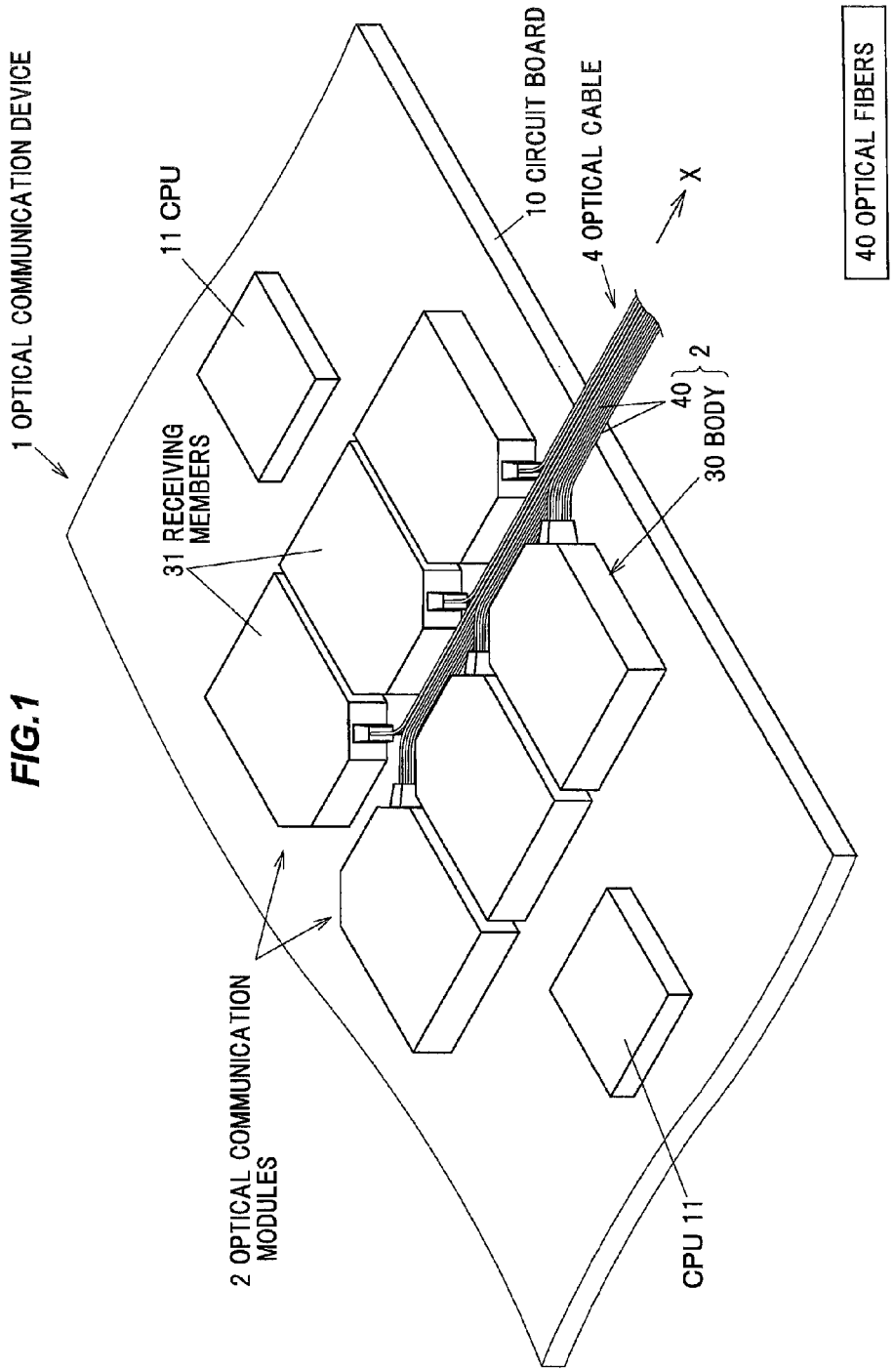
FIG. 1 is a perspective view showing a configuration example of an optical communication device in an embodiment according to the invention.

FIG. 1 is a perspective view showing a configuration example of an optical communication device 1 in a present embodiment.

This optical communication device 1 includes a circuit board 10 formed with a wiring pattern thereon, a plurality of optical communication modules 2 arranged on the circuit board 10, and a plurality of CPUs (Central Processing Units) 11 mounted on the circuit board 10.

The circuit board 10 is formed of e.g. a glass epoxy substrate, and formed into a plate shape having a predetermined thickness. The circuit board 10 is mounted with a connector (not shown) thereon for connection with the optical communication modules 2.

The CPUs 11 are electrically connected to the optical communication modules 2 via a wiring pattern and the connector (not shown) of the circuit board 10, and send or receive an electrical signal to or from the optical communication modules 2. Specifically, the CPUs 11 output an electrical signal to be sent from the optical communication device 1 to the optical communication modules 2, and the optical communication modules 2 having received the electrical signal transduce the input electrical signal into an optical signal and send the optical signal to the other communication device. Also, the CPUs 11 receive an electrical signal into which the optical communication modules 2 transduce an optical signal sent from the other communication device, and based on that electrical signal, perform predetermined information processing.

The optical communication modules 2 are formed to have a hexagonal bottom surface (shaped by chamfering two corners of one longitudinal end of a rectangle) opposite the circuit board 10, and include each body 30 and each optical cable 4 comprising a plurality of optical fibers 40 drawn from the respective body 30. The plurality of optical fibers 40 of the respective optical cable 4 include a plurality of the transmission optical fibers 40 to propagate an optical signal sent from the optical communication modules 2 and a plurality of the reception optical fibers 40 to propagate an optical signal received in the optical communication modules 2.

In this embodiment, the six (three and three) optical communication modules 2 are aligned in two columns respectively, and the optical cables 4 are routed in an arrow X direction from between the optical communication modules 2 in each of the two columns. This arrow X direction is parallel to the direction of the alignment of the respective bodies 30 of the plurality of optical communication modules 2 in each of the two columns. That is, the respective bodies 30 of the plurality of optical communication modules 2 are aligned in the predetermined alignment direction on the circuit board 10, and the optical cables 4 are routed in this predetermined alignment direction (i.e. in the arrow X direction) on the circuit board 10. Also, in the present embodiment, the respective optical cable 4 includes the four transmission optical fibers 40 and the corresponding four reception optical fibers 40.

Also, as shown in FIG. 1, the plurality of optical fibers 40 of the respective optical cable 4 are drawn from an outer surface of a receiving member 31 and in an oblique direction relative to the direction of the alignment of the respective bodies 30 of the plurality of optical communication modules 2 on the circuit board 10.

Figure 2A:
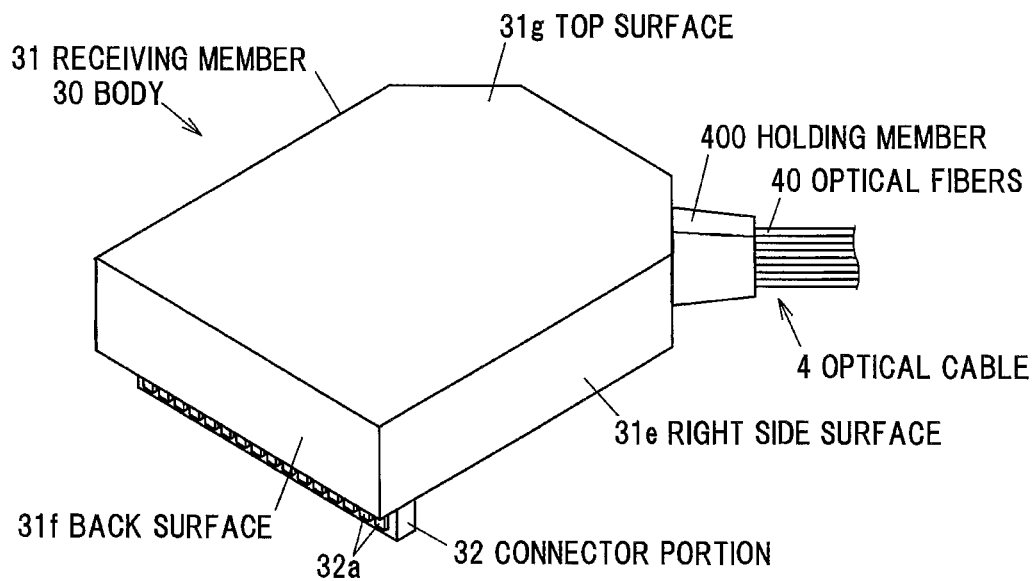
FIGS. 2A and 2B are perspective views, respectively, showing an appearance of an optical communication module.
Figure 2B:
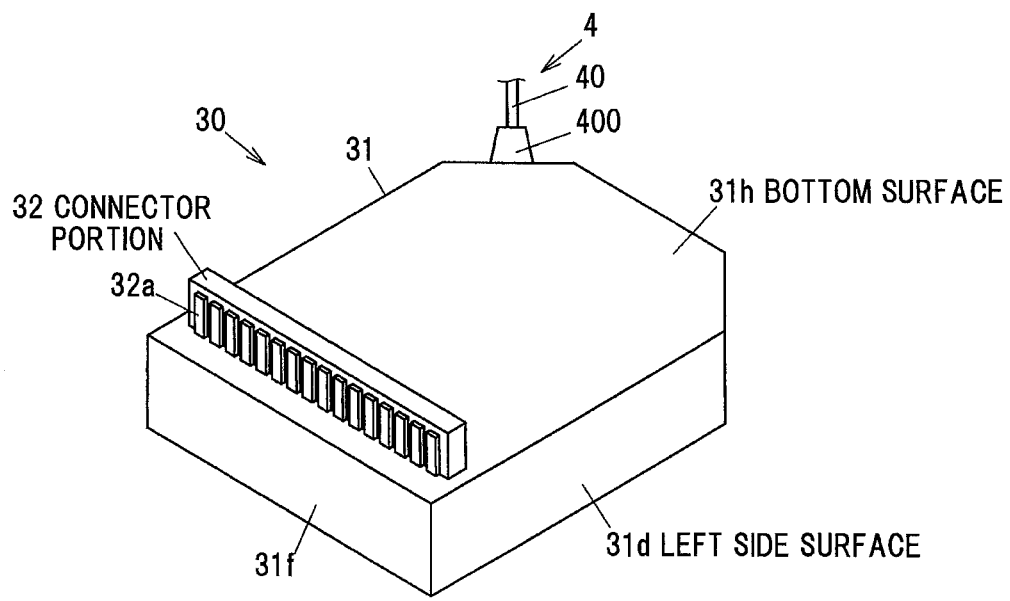
Figure 4:
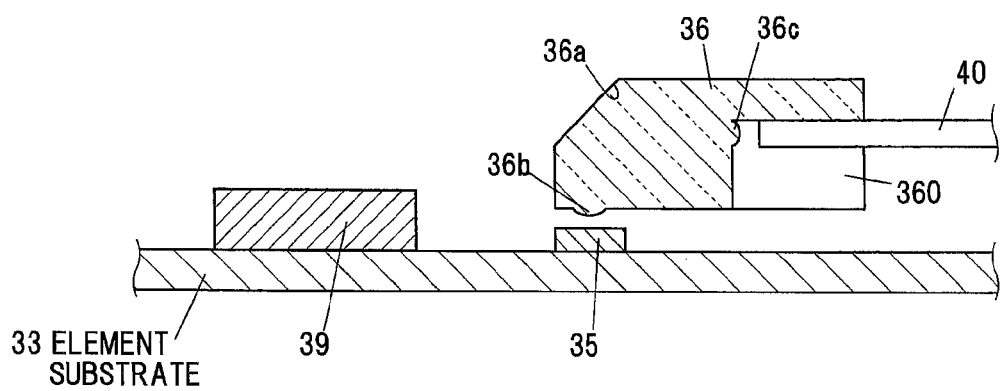
FIG. 4 is a cross sectional view taken along line A-A in FIG. 3C.

FIGS. 2A and 2B are perspective views, respectively, showing a configuration example of the optical communication module 2 in the embodiment. FIG. 3A is a front view showing that optical communication module 2, FIG. 3B is a left side view showing that optical communication module 2, FIG. 3C is a plan view showing that optical communication module 2, FIG. 3D is a right side view showing that optical communication module 2, FIG. 3E is a back view showing that optical communication module 2, and FIG. 3F is a bottom plan view showing that optical communication module 2. FIG. 4 is a cross sectional view taken along line A-A in FIG. 3C. Note that, in FIG. 4, no receiving member 31 is shown.

The body 30 of the optical communication module 2 includes a receiving member 31 made of a resin, a connector portion 32, which is protruded from the outer surface (a bottom surface 31h to be described later) of the receiving member 31, and an element substrate 33, which is received in the receiving member 31. Also, the body 30 includes a light emitting element 34, a light receiving element 35, a lens member 36, driver IC 38, and a preamplifier IC 39 mounted on the element substrate 33 inside the receiving member 31.

The receiving member 31 includes, between a bottom surface 31h, from which the connector portion 32 projects, and a top surface 31g opposite the bottom surface 31h, a first inclined surface 31b, which serves as a first side surface, from which the plurality of optical fibers 40 are drawn, a front surface 31a, which serves as a second side surface, which meets the first inclined surface 31b at an obtuse angle, and a second inclined surface 31c, which serves as a third side surface, which meets the front surface 31a at an obtuse angle on an opposite side of the front surface 31a to the first inclined surface 31b. Also, the receiving member 31 includes a left side surface 31d, a right side surface 31e, and a back surface 31f between the bottom surface 31h and the top surface 31g.

The left side surface 31d and the right side surface 31e are parallel to each other and are at right angles to the back surface 31f. The front surface 31a and the back surface 31f are parallel to each other. The bottom surface 31h and the top surface 31g have a longitudinal direction in the parallel direction to the left side surface 31d and the right side surface 31e, and a transverse direction at right angles to that longitudinal direction is parallel to the front surface 31a and the back surface 31f.

Note that each surface name is shown for description clarification and should not be construed as limiting orientations, etc. of the optical communication modules 2 in an actual usage state. Also, the outer surface of the receiving member 31 may be formed with a surface other than the above described surfaces.

The connector portion 32 is protruded from the bottom surface 31h of the receiving member 31 at a position adjacent to the back surface 31f relative to the front surface 31a in the longitudinal direction of the bottom surface 31h, i.e. from the bottom surface 31h side of the back surface 31f opposite the first inclined surface 31b, from which the optical fibers 40 are drawn, and the connector portion 32 is extended in the transverse direction of the bottom surface 31h. The connector portion 32 is provided with a plurality (in the present embodiment, sixteen) of electrodes 32a, which are aligned in a straight line, and the plurality of electrodes 32a are aligned in the transverse direction of the bottom surface 31h.

By the connector portion 32 being mated to a connector which is mounted on the circuit board 10, the optical communication module 2 is fed from the circuit board 10 through the plurality of electrodes 32a of the connector portion 32, and sends or receives an electrical signal to or from the CPUs 11 mounted on the circuit board 10.

The plurality of optical fibers 40 are elastically held to an elastic holding member 400 which is jutted out from and attached to the first inclined surface 31b. This allows for suppressing damage due to large curvature bending of the optical fibers 40 adjacent to the first inclined surface 31b.

The plurality of optical fibers 40 are drawn from the first inclined surface 31b of the receiving member 31 and in an oblique direction relative to the direction of the alignment of the plurality of electrodes 32a formed in the connector portion 32. More specifically, the plurality of optical fibers 40 are drawn from the first inclined surface 31b of the receiving member 31 and in an oblique direction (in the arrow Y direction) at a predetermined angle $\theta_1$ relative to a straight line $O_1$ which is parallel to the direction of the alignment of the plurality of electrodes 32a and which is passed through the front surface 31a.

The desirable range of this predetermined angle $\theta_1$ is 45±15 degrees (30 degrees-60 degrees). In this embodiment, the predetermined angle $\theta_1$ is set at 45 degrees. If the angle $\theta_1$ exceeds 60 degrees, the advantageous effect of being able to mount the respective bodies 30 of the optical communication modules 2 at a high density is poor, while if the angle $\theta_1$ is smaller than 30 degrees, the optical fibers 40 tend to interfere with the respective bodies 30 of the adjacent other optical communication modules 2.

Note that, in the present embodiment, the plurality of optical fibers 40 are drawn at right angles to the first inclined surface 31b, but that if the plurality of optical fibers 40 are drawn in an oblique direction relative to the direction of the alignment of the plurality of electrodes 32a, that drawing direction may not be at right angles to the first inclined surface 31b.

As shown in FIG. 3C, inside the receiving member 31, there are arranged the light emitting element 34, the light receiving element 35, the lens member 36, the driver IC 38, and the preamplifier IC 39, in the direction of the drawing of the optical fiber 40 and in the oblique direction relative to the direction of the alignment of the plurality of electrodes 32a. Also, the light emitting element 34 and the light receiving element 35 are arranged side by side at right angles to the direction of the drawing of the optical fiber 40. In this embodiment, one light emitting element 34 and one light receiving element 35 are arranged, but, for example, a plurality of the light, emitting elements 34 or the light receiving elements 35 may be arranged side by side at right angles to the direction of the drawing of the optical fiber 40.

The light emitting element 34 is a photoelectric conversion element which transduces an electrical signal into an optical signal, and emits laser light in proportion to an electrical signal provided from the CPUs 11. The light emitting element 34 may be, e.g. a Fabry-Perot laser, a DFB (Distributed Feedback) laser or a VCSEL (Vertical Cavity Surface Emitting Laser), or the like.

The light receiving element 35 is a photoelectric conversion element which transduces an optical signal into an electrical signal, and outputs an electrical signal in proportion to light which has propagated through the optical fibers 40. The light receiving element 35 may be e.g. a photodiode.

As shown in FIG. 4, the lens member 36 is arranged with the light emitting element 34 and the light receiving element 35 between it and the element substrate 33. The lens member 36 is made of e.g. a resin, such as PMMA (polymethyl methacrylate (acrylic)), which is transparent to a wavelength of the optical signal propagating through the optical fibers 40. Also, the lens member 36 is formed with a reflecting surface 36a, which bends an optical path of incident light from the optical fibers 40 or the light emitting element 34 by 90 degrees, a first lens portion 36b, which is formed on a surface opposite the light emitting element 34 and the light receiving element 35, and a second lens portion 36c, which is formed on a surface opposite the end face of the optical fibers 40. Also, the lens member 36 is formed with a receiving groove 360, which is open toward the first inclined surface 31b side end face to receive the ends of the optical fibers 40.

The diffusion light emitted from the light emitting element 34 in the opposite direction and perpendicularly to the element substrate 33 is incident on the first lens portion 36b of the lens member 36, resulting in parallel light. The light passed through the first lens portion 36b is internally reflected off the reflecting surface 36a, and passed parallel to the element substrate 33, into the second lens portion 36c. The light passed into the second lens portion 36c is collected at the ends of the transmission optical fibers 40 received in the receiving groove 360 by the second lens portion 36c. Also, the light emitted from the reception optical fibers 40 is passed parallel to the element substrate 33 into the second lens portion 36c, resulting in parallel light. The light passed through the second lens portion 36c is reflected off the reflecting surface 36a, and collected into the light receiving element 35 disposed on the element substrate 33 by the first lens portion 36b. In this manner, the light emitting element 34 and the transmission optical fibers 40 are optically coupled together and the light receiving element 35 and the reception optical fibers 40 are optically coupled together, by the single lens member 36.

The driver IC 38 provides a driving current to the light emitting element 34 so that the light emitting element 34 emits light based on an electrical signal to be provided through the connector portion 32 from the CPUs 11.

The preamplifier IC 39 amplifies an electrical signal output from the light receiving element 35 and outputs it through the plurality of electrodes 32a of the connector portion 32 to the CPUs 11.

The optical communication module 2 configured as described above amplifies with the driver IC 38 the electrical signal received through the connector portion 32 from the CPUs 11, transduces it into an optical signal with the light emitting element 34 and outputs that optical signal through the optical fibers 40 to the other communication device. Also, the optical communication modules 2 transduces that optical signal having propagated through the reception optical fibers 40 into an electrical signal with the light receiving element 35, amplifies this electrical signal with the preamplifier IC 39 and outputs it through the connector portion 32 to the CPUs 11.

Figure 5:
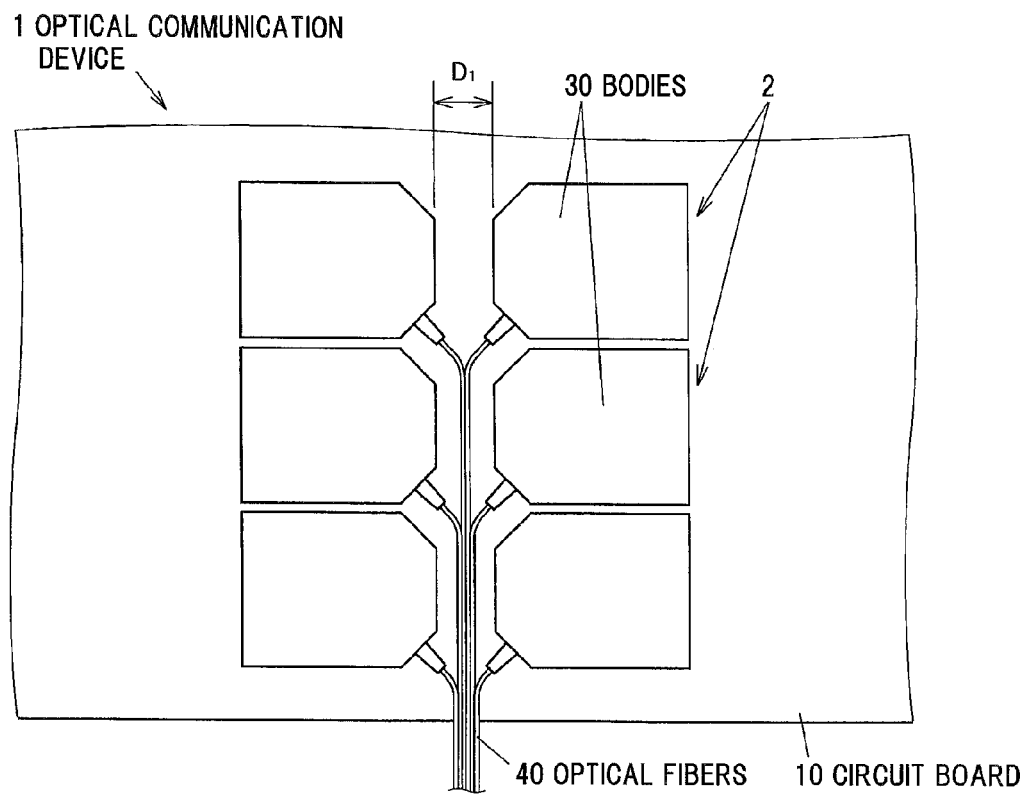
FIG. 5 is a plan view showing a configuration of the optical communication device.
Figure 9:
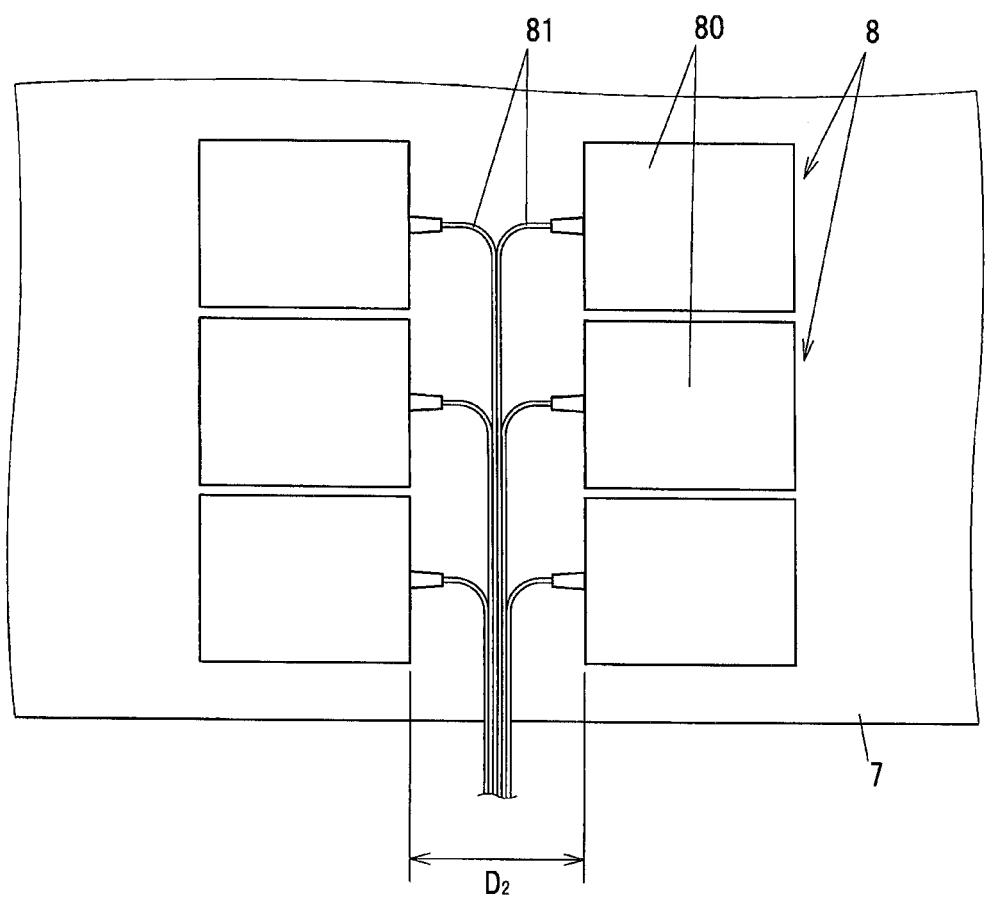
FIG. 9 is a schematic view showing a configuration example of a conventional optical communication device.

FIG. 5 is a plan view showing the optical communication device 1 shown in FIG. 1. In this embodiment, the plurality of optical fibers 40 are drawn in the oblique direction relative to the direction of the alignment of the plurality of electrodes 32a. Therefore, it is possible to make the distance $D_1$ between the optical communication modules 2 arranged in the multiple columns (i.e., the distance $D_1$ between the respective front surfaces 31a of the pairs of the optical communication modules 2 which are opposite each other with the optical fibers 40 therebetween) shorter than the distance $D_2$ between the optical communication modules 8 in the conventional example as shown in FIG. 9. This allows for reducing the area the optical communication modules 2 occupy on the circuit board 10 and arranging the plurality of the optical communication modules 2 on the circuit board 10 at a high density.

Figure 6:
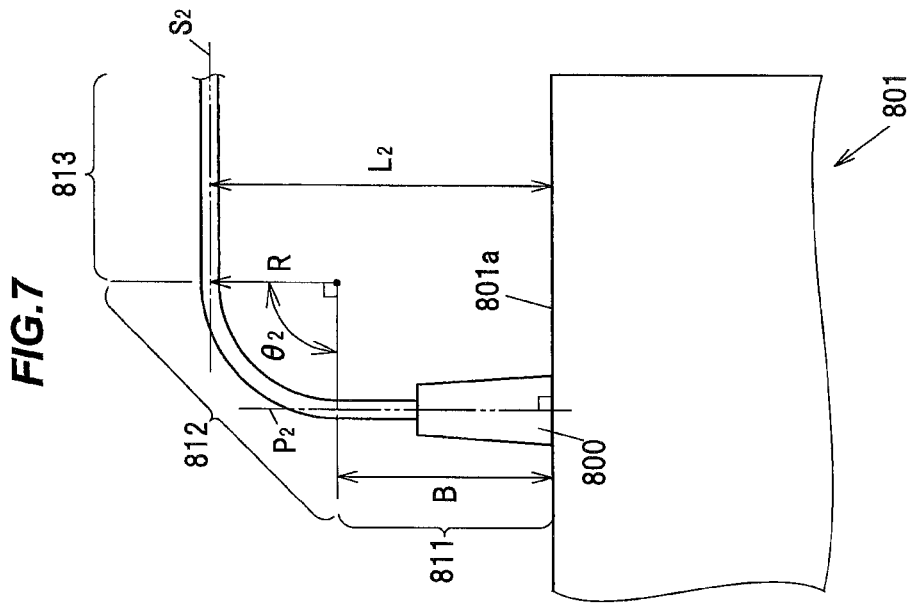
FIG. 6 is an enlarged view showing the optical communication module in the embodiment.
Figure 7:
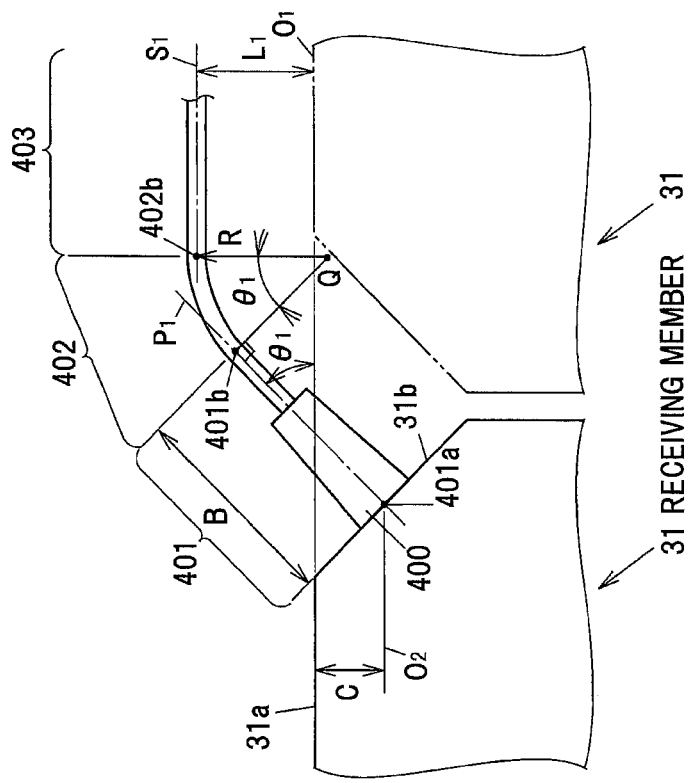
FIG. 7 is an enlarged view showing an optical communication module in a comparative example.

Referring next to FIGS. 6 and 7, functions and advantageous effects of the present embodiment are described in more detail.

FIG. 6 is an enlarged view showing one example of a bent state of the optical fibers 40 drawn from the first inclined surface 31b of the optical communication module 2. FIG. 7 is an enlarged view showing a comparative example of a bent state of the optical fiber 81 drawn from the receiving member 80 in the conventional optical communication module 8 shown in FIG. 9.

As shown in FIG. 6, the optical fibers 40 includes a lead portion 401, which is drawn from the first inclined surface 31b obliquely at the predetermined angle $\theta_1$ relative to the direction of the alignment of the plurality of electrodes 32a, a bent portion 402, which is bent at a predetermined radius of curvature, and an extended portion 403, which is extended from an end of the bent portion 402 and parallel to the direction of the alignment of the plurality of electrodes 32a.

The lead portion 401 is shaped in a straight line which extends at right angles to the first inclined surface 31b from one end 401a on the first inclined surface 31b side to the other end 401b on the bent portion 402 side.

The bent portion 402 is formed in a circular arc shape centered on a center point Q and having a predetermined radius of curvature R. This radius of curvature R is an allowable bending radius of the optical fibers 40. Here, the allowable bending radius refers to a value, which is likely to cause break in optical fiber or degradation in optical properties when the optical fiber is bent at a radius of curvature smaller than that value, and which is specified in optical fiber manufacturers, etc. The allowable bending radius is e.g. 15 mm in the case of single mode fiber, and, for example, 15 mm to 30 mm in the case of multi-mode fiber.

The extended portion 403 is extended from the extended portion 403 side end 402b of the bent portion 402 and in the parallel direction to the straight line $O_1$, and is formed in a straight line.

The optical fibers 40 configured as described above are located at a distance $L_1$ from the straight line $O_1$ to the central axis line $S_1$ in the extended portion 403 of the optical fibers 40, where the distance $L_1$ may be expressed by the following formula:

$$L_1 = B \sin \theta_1 + R - C - R \cos \theta_1$$

where B is the distance from one end 401a to the other end 401b and C is the distance from the straight line $O_2$ through one end 401a and parallel to the straight line $O_1$ to the straight line $O_1$.

As shown in FIG. 7, on the other hand, the optical fiber 81 of the conventional optical communication module 8 as shown in the comparative example includes a lead portion 811, which is drawn perpendicularly from a front surface 801a of a receiving member 801, a bent portion 812, which is formed in a circular arc shape having a radius of curvature R and a circumferential angle $\theta_2$ of 90 degrees, and an extended portion 813, which is extended from an end of the bent portion 812 and in the parallel direction to the front surface 801a.

The optical fiber 81 configured as described above is located at a distance $L_2$ from the front surface 801a of the receiving member 801 to a central axis line $S_2$ in the extended portion 813 of the optical fiber 81, where the distance $L_2$ may be represented in the following formula:

$$L_2 B + R$$

Therefore, the distance $L_1$ is shorter than the distance $L_2$, in other words, the inequality $L_1 < L_2$ holds. That is, because the distance from the front surface 31a of the receiving member 31 to the extended portion 403 of the optical fibers 40 is shortened, it is possible to make the distance $D_1$ between the respective bodies 30 of the optical communication modules 2 arranged in the multiple columns shorter than the distance $D_2$ between the optical communication modules 8 in the conventional example as shown in FIG. 9.

The above described embodiment has the following functions and advantageous effects.

(1) The respective plurality of optical fibers 40 of the optical communication modules 2 are drawn in the oblique direction relative to the direction of the alignment of the plurality of electrodes 32a. Therefore, when the plurality of the optical communication modules 2 are aligned on the circuit board 10, it is possible to shorten the protrusion length of the optical cables 4 (the optical fibers 40) at right angles to the direction of the alignment of the plurality of the optical communication modules 2 on the circuit board 10. This allows for reducing the area the optical communication modules 2 occupy on the circuit board 10 and arranging the plurality of the optical communication modules 2 on the circuit board 10 at a high density.

(2) The receiving member 31 is formed with the second inclined surface 31c on its opposite side to the first inclined surface 31b in the transverse direction of the bottom surface 31h and the top surface 31g. Therefore, when the plurality of the optical communication modules 2 are aligned in a straight line, it is possible to suppress the interference between the optical cables 4 (the optical fibers 40) drawn from the adjacent optical communication modules 2 and the receiving member 31. This allows for, for example, when the optical cables 4 are pulled in the direction of the extension of the extended portions 403 thereof, preventing the optical cables 4 from touching the corners of the receiving members 31 of the adjacent optical communication modules 2 and being damaged. Also, it is possible to further shorten the distance between the receiving members 31 of the adjacent optical communication modules 2.

(3) Because the plurality of optical communication modules 2 can be arranged on the circuit board 10 at a high density, it is possible to reduce the size of the optical communication device 1.

(4) Because the light emitting element 34 and the light receiving element 35 are arranged side by side at right angles to the direction of the drawing of the optical fiber 40, it is possible to easily configure the lens member 36, for example, in a rectangular shape, and ensure reduction in the production cost of the optical communication modules 2. That is, if the light emitting element 34 and the light receiving element 35 are arranged, for example parallel to the direction of the drawing of the optical fiber 40, the light emitting element 34 and the light receiving element 35 are separate in optical path bending position in the direction of the drawing of the optical fiber 40, and therefore it is necessary to provide a plurality of the reflecting surfaces in the lens member, whereas the present embodiment eliminates the need to adopt such a configuration, and allows for the single lens member 36 formed with one reflecting surface 36a to optically couple the optical fibers 40 to the light emitting element 34 and the light receiving element 35.

Variations of the Embodiment

Next, a variation of the embodiment is described with reference to FIG. 8.

Figure 8:
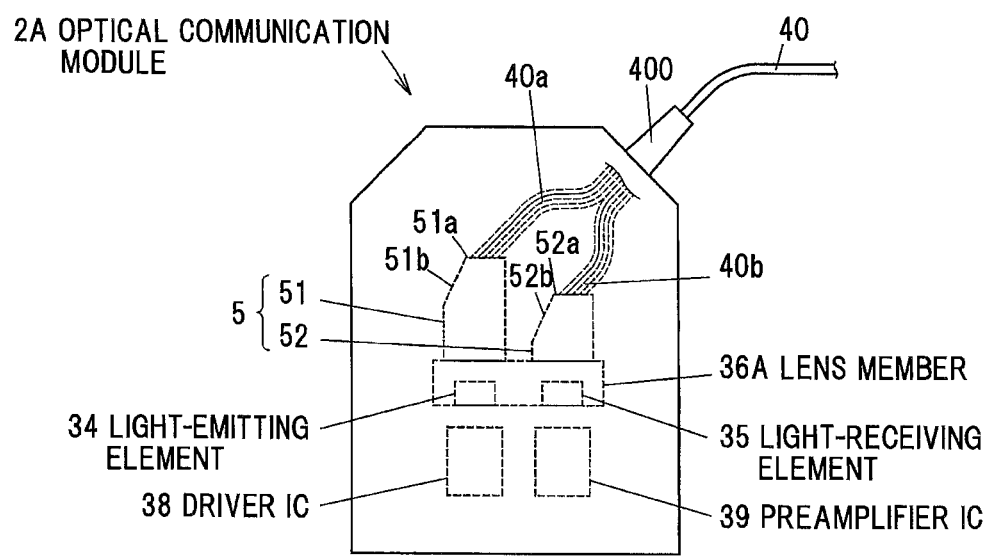
FIG. 8 is a plan view showing a configuration of an optical communication module in a variation of the embodiment.

FIG. 8 is a plan view showing a configuration of an optical communication module 2A in the variation of the embodiment. In FIG. 8, elements having analogous functions to those described with reference to FIGS. 1 to 5 are given the same numerals or characters, and duplicated descriptions thereof are omitted.

In the above described embodiment, the light emitting element 34, the light receiving element 35, the lens member 36, the driver IC 38 and the preamplifier IC 39 mounted on the element substrate 33 are arranged at the angle of 45 degrees relative to the longitudinal direction and the transverse direction of the receiving member 31, whereas, in this modification, these parts are arranged in the longitudinal direction of the receiving member 31. Also, the optical communication module 2A in this modification is different from that of the above described embodiment in that the optical communication module 2A includes a lens member 36A, and a waveguide member 5, which is arranged adjacent to the lens member 36A. The waveguide member 5 is configured to bend an optical path between the lens member 36A and the plurality of optical fibers 40 (the transmission optical fibers 40a and the reception optical fibers 40b), and guide light emitted from the lens member 36A to the transmission optical fibers 40a and light emitted from the reception optical fibers 40b to the lens member 36A.

More specifically, the waveguide member 5 is configured as including a first waveguide member 51, which guides light emitted from the light emitting element 34 and collected at the lens member 36A to the transmission optical fibers 40a, and a second waveguide member 52, which guides light emitted from the reception optical fibers 40b to the lens member 36A.

The first waveguide member 51 includes a connecting portion 51a, which is connected with an end of the transmission optical fibers 40a, and a reflecting surface 51b, which bends an optical path of incident light from the lens member 36A by 45 degrees. The second waveguide member 52 includes a connecting portion 52a, which is connected with an end of the reception optical fibers 40b, and a reflecting surface 51b, which bends an optical path of incident light from the reception optical fibers 40b by 45 degrees. As with the lens member 36 and the lens member 36A, the first waveguide member 51 and the second waveguide member 52 are formed of a resin such as PMMA, which is transparent to the optical signals.

The light emitted from the light emitting element 34 in the opposite direction and perpendicularly to the element substrate 33 is internally reflected off the reflecting surface formed in the lens member 36A, and is passed parallel to the element substrate 33, into the first waveguide member 51. The light passed into the first waveguide member 51 is internally reflected off the reflecting surface 51b of the first waveguide member 51, and guided to the transmission optical fibers 40a.

Also, the light emitted from the reception optical fibers 40b is internally reflected off the reflecting surface 52b of the second waveguide member 52, and is passed parallel to the element substrate 33, into the lens member 36A. The light passed into the lens member 36A is reflected off the reflecting surface formed in the lens member 36A, and is collected into the light receiving element 35 disposed on the element substrate 33.

In this manner, the light emitting element 34 and the transmission optical fibers 40a are optically coupled together and the light receiving element 35 and the reception optical fibers 40b are optically coupled together, by the waveguide member 5 interposed between the lens member 36A and the plurality of optical fibers 40.

This modification has the similar functions and advantageous effects to those of the embodiment. Also, because the light emitting element 34 and the light receiving element 35 are arranged side by side in the parallel direction to the direction of the alignment of the plurality of electrodes 32a, the positioning accuracy at the time of mounting of the light emitting element 34 and the light receiving element 35 to the element substrate 33 is enhanced, and the proper optical coupling of the light emitting element 34 and the light receiving element 35 to the lens member 36A and the waveguide member 5 is facilitated.

Although the embodiment of the present invention has been described above, the embodiment described above should not be construed to limit the invention in the appended claims. It should also be noted that not all the combinations of the features described in the above embodiment are essential to the means for solving the problems of the invention.

Also, the present invention may be appropriately modified and practiced without departing from the spirit and scope thereof. For example, although in the above embodiment it has been described that the optical communication modules 2 include the light emitting element 34 and the light receiving element 35, the optical communication modules 2 may instead include only the light emitting element 34, or only the light receiving element 35.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical communication module, comprising:
    an element substrate;
    an optoelectronic conversion element to transduce an optical signal into an electrical signal or an electrical signal into an optical signal, the optoelectronic conversion element being mounted on the element substrate;
    an optical fiber including an end and being optically coupled to the optoelectronic conversion element;
    a receiving member including an outer surface and receiving the element substrate, the end of the optical fiber and the optoelectronic conversion element; and
    a plurality of electrodes protruded from the outer surface of the receiving member and aligned in a straight line,
    wherein the receiving member includes a first side surface, which is inclined with respect to a direction parallel to a direction of the alignment of the plurality of electrodes forming a first chamfered corner, a second side surface, which meets the first side surface at an obtuse angle, and a third side surface, which meets the second side surface at an obtuse angle on an opposite side of the second side surface to the first side surface forming a second chamfered corner,
    wherein the optical fiber is being drawn from the first chamfered corner of the receiving member and in an oblique direction relative to the direction of the alignment of the plurality of electrodes.

2. The optical communication module according to claim 1, wherein the direction of the alignment of the plurality of electrodes and the direction of the drawing of the optical fiber make an angle within a range of 45±15 degrees.

3. The optical communication module according to claim 1, wherein the receiving member includes a plurality of the optoelectric conversion elements arranged side by side at right angles to the direction of the drawing of the optical fiber, and a single lens member, which optically couples the plurality of the optoelectric conversion elements and the optical fiber together.

4. The optical communication module according to claim 1, wherein the receiving member includes a plurality of the optoelectric conversion elements arranged side by side in the direction of the alignment of the plurality of electrodes, a lens member, and a waveguide member interposed between the lens member and the optical fiber, the lens member and the waveguide member optically coupling the plurality of the optoelectric conversion elements and the optical fiber together.

5. An optical communication device, comprising:
    a circuit board formed with a wiring pattern thereon; and
    a plurality of optical communication modules arranged on the circuit board, each of the optical communication modules comprising:
    a body including an optoelectric conversion element to transduce an optical signal into an electrical signal or an electrical signal into an optical signal, and a receiving member including an outer surface and receiving the respective optoelectric conversion element, the respective bodies of the optical communication modules being aligned in a predetermined alignment direction on the circuit board, each receiving member including a first side surface, which is inclined with respect to a direction parallel to a direction of the alignment of the plurality of electrodes forming a first chamfered corner, a second side surface, which meets the first side surface at an obtuse angle, and a third side surface, which meets the second side surface at an obtuse angle on an opposite side of the second side surface to the first side surface forming a second chamfered corner; and
    an optical fiber optically coupled to the respective optoelectric conversion element and drawn from the first chamfered corner of the respective receiving member and in an oblique direction relative to the predetermined alignment direction.

* * * * *